United States Patent [19]
Gorin et al.

[11] Patent Number: 5,860,063
[45] Date of Patent: Jan. 12, 1999

[54] AUTOMATED MEANINGFUL PHRASE CLUSTERING

[75] Inventors: Allen Louis Gorin, Berkeley Heights; Jeremy Huntley Wright, Warren, both of N.J.

[73] Assignee: AT&T Corp, Middletown, N.J.

[21] Appl. No.: 893,888

[22] Filed: Jul. 11, 1997

[51] Int. Cl.[6] .................................................. G10L 5/06

[52] U.S. Cl. ...................... 704/257; 704/254; 704/251; 704/245

[58] Field of Search .................................. 704/9; 395/12; 701/231, 232, 245, 246, 243, 244, 251, 254, 255, 256, 257

[56] References Cited

U.S. PATENT DOCUMENTS

| | | | |
|---|---|---|---|
| 5,384,892 | 1/1995 | Strong | 704/243 |
| 5,434,777 | 7/1995 | Luciw | 704/9 |
| 5,675,707 | 10/1997 | Gorin et al. | 704/257 |

*Primary Examiner*—David R. Hudspeth
*Assistant Examiner*—Susan Wieland

[57] ABSTRACT

A system and method for automated task selection is provided where a selected task is identified from the natural speech of the user making the selection. The system and method incorporate the selection of meaningful phrases through the use of a test for significance. The selected meaningful phrases are then clustered. The meaningful phrase clusters are input to a speech recognizer that determines whether any meaningful phrase clusters are present in the input speech. Task-type decisions are then made on the basis of the recognized meaningful phrase clusters.

30 Claims, 6 Drawing Sheets

```
┌─────────────────────────────────────────────────────────┐
│              ERRORS IN DETECTING                        │
│              BILLING CREDIT QUERIES                     │
├─────────────────────────────────────────────────────────┤
│ FALSE DETECTIONS                                        │
│ YES I NEED A SPRINT OPERATOR 1_NEED_CREDIT_EOS          │
│ YES I HAVE A NUMBER HERE AND I DONT KNOW IF ITS A_WRONG_NUMBER ... │
│ I WAS TRYING TO GET 612 XXX XXXX AND IT SAID IT WAS_DISCONNECTED ... │
│                                                         │
│ MISSED DETECTIONS                                       │
│ I AM TRYING TO CALL WOOSTER AND THE NUMBER I HAVE       │
│    RINGS TO A DIFFERENT NUMBER                          │
│ IM GOING TO BLAME THIS ONE ON MY WIFE I MISREAD HER HANDWRITING │
│ IM-DIALING 215 XXX XXXX AND I KEEP GETTING BELLS AND THINGS LIKE THAT │
│ IM CALLING A LONG DISTANCE NUMBER IN THE 201 AREA CODE  │
│    IT JUST WENT BOOO BOOO BOOO                          │
└─────────────────────────────────────────────────────────┘
```

*FIG. 1*

```
┌─────────────────────────────────────────────────────────┐
│              CORRECT DETECTIONS OF                      │
│              BILLING CREDIT QUERIES                     │
├─────────────────────────────────────────────────────────┤
│ I PLACED A CALL AND I GOT_A_WRONG_NUMBER EARLIER THIS AFTERNOON │
│ YES I MISDIALED A NUMBER                                │
│ I_WAS_CUT_OFF WHEN TRYING TO CALL THIS NUMBER           │
│ I_WAS_DIALING 1 XXX XXX XXXX AND I GOT SOMEONE ELSE     │
│ YES OPERATOR I_JUST_DIALED_AN_INCORRECT_NUMBER          │
│ YES I WOULD LIKE TO_GET_CREDIT_FOR A NUMBER I CALLED    │
└─────────────────────────────────────────────────────────┘
```

*FIG. 2*

| DETECTING BILLING CREDIT REQUESTS VIA SALIENT PHRASES | | |
|---|---|---|
| CLASSIFICATION RATE P(CREDIT/PHRASE) | COVERAGE P(PHRASE/CREDIT) | PHRASE |
| 0.92 | 0.48 | WRONG |
| 0.98 | 0.41 | WRONG NUMBER |
| 0.95 | 0.45 | WRONG (NUMBER/EOS/CALL) |
| 0.97 | 0.42 | (A/THE WAS) WRONG (NUMBER/EOS/CALL) |
| 0.95 | 0.50 | F(WRONG) / F(DIALED) |
| 0.95 | 0.57 | F(WRONG) / F(DIALED) / F(CREDIT) |
| 0.95 | 0.59 | PREVIOUS / F(DISCONNECTED) |
| 0.95 | 0.64 | PREVIOUS / F(MISDIALED) / F(CUT OFF) |

AUTOMATED MEANINGFUL PHRASE CLUSTERING

BACKGROUND OF THE INVENTION

1. Field of Invention

This invention relates to speech processing, and more particularly to a system and method for automated clustering of meaningful phrases in relation to the performance of one or more desired tasks.

2. Description of Related Art

In communications networks there are many instances where it is desirable to provide for automated implementation of particular tasks desired by a user of such a network—i.e., implementation of such a task without human intervention. In the prior art, such automated task implementation is generally carried out via a plurality of menu choices which must be selected by designated signals from a user, general numeric signals generated by a keypad associated with a user's telephone set, and in some cases by the user pronouncing such numerals as key words. In many cases such menu-based automated task implementation arrangements involve multi-tiered menus. Such multi-tiered menu structures are generally unpopular with users and remarkably inefficient at achieving the desired objective. The percentage of successful routings through such a multi-tiered menu structure can be quite low. Stated differently, in such circumstances, many of the calls accessing such a multi-tiered menu structure might be either terminated without the caller having reached the desired objective or else defaulted to an operator (or other manned default station).

The limitations in the prior art were addressed in U.S. patent application Ser. No. 08/528,577, "Automated Phrase Generation", and filed Sep. 15, 1995, and U.S. Pat. No. 5,675,707, "Automated Call Router System and Method", issued Oct. 7, 1997 which are incorporated herein by reference. These applications provide a methodology for automated task selection where the selected task is identified in the natural speech of a user making such a selection. A fundamental aspect of this method is a determination of a set of meaningful phrases. Such meaningful phrases are determined by a grammatical inference algorithm which operates on a predetermined corpus of speech utterances, each such utterance being associated with a specific task objective, and wherein each utterance is marked with its associated task objective.

The determination of the meaningful phrases used in the above noted application is founded in the concept of combining a measure of commonality of words and/or structure within the language—i.e., how often groupings of things co-occur—with a measure of significance to a defined task for such a grouping. That commonality measure within the language can be manifested as the mutual information in n-grams derived from a database of training speech utterances and the measure of usefulness to a task is manifested as a salience measure.

Mutual information ("MI"), which measures the likelihood of co-occurrence for two or more words, involves only the language itself. For example, given War and Peace in the original Russian, one could compute the mutual information for all the possible pairings of words in that text without ever understanding a word of the language in which it is written. In contrast, computing salience involves both the language and its extra-linguistic associations to a device's environment. Through the use of such a combination of MI and a salience factor, meaningful phrases are selected which have both a positive MI (indicating relative strong association among the words comprising the phrase) and a high salience value.

However, such methods are based upon the probability that separate sets of salient words occur in the particular input utterance. For example, the salient phrases "made a long distance", "a long distance call", and "long distance call", while being spoken by the users to achieve the same objective, would be determined as separate meaningful phrases by that grammatical inference algorithm based on their individual mutual information and salience values. Thus, many individual phrases which are virtually identical and have the same meaning, are generated, remain separate, and represent independent probabilities of occurrence in the grammatical inference algorithm. By not grouping these "alike" salient phrases, the above methods could provide inferior estimates of probability and thus ultimately provide improper routing of requests from users.

SUMMARY OF THE INVENTION

A method and system for automated task selection is provided where a selected task is identified from the natural speech of the user making the selection. The method and system incorporate the selection of meaningful phrases through the use of a test for significance. The selected meaningful phrases are then clustered using a combination of string and semantic distortions. The meaningful phrase clusters are input to a speech recognizer that determines whether any meaningful phrase clusters are present in the input speech. Task-type decisions are then made on the basis of the recognized meaningful phrase clusters.

BRIEF DESCRIPTION OF THE DRAWINGS

FIG. 1 illustrates examples of false and missed detection by a classifier for an automated call routing system based on use of "meaningful phrases";

FIG. 2 illustrates examples of correct detection by a classifier for an automated call routing system based on use of "meaningful phrases";

FIG. 3 illustrates an example of the advantage provided by the "meaningful phrase" classification parameter of the system of the invention;

DETAILED DESCRIPTION OF INVENTION

Figure 4:
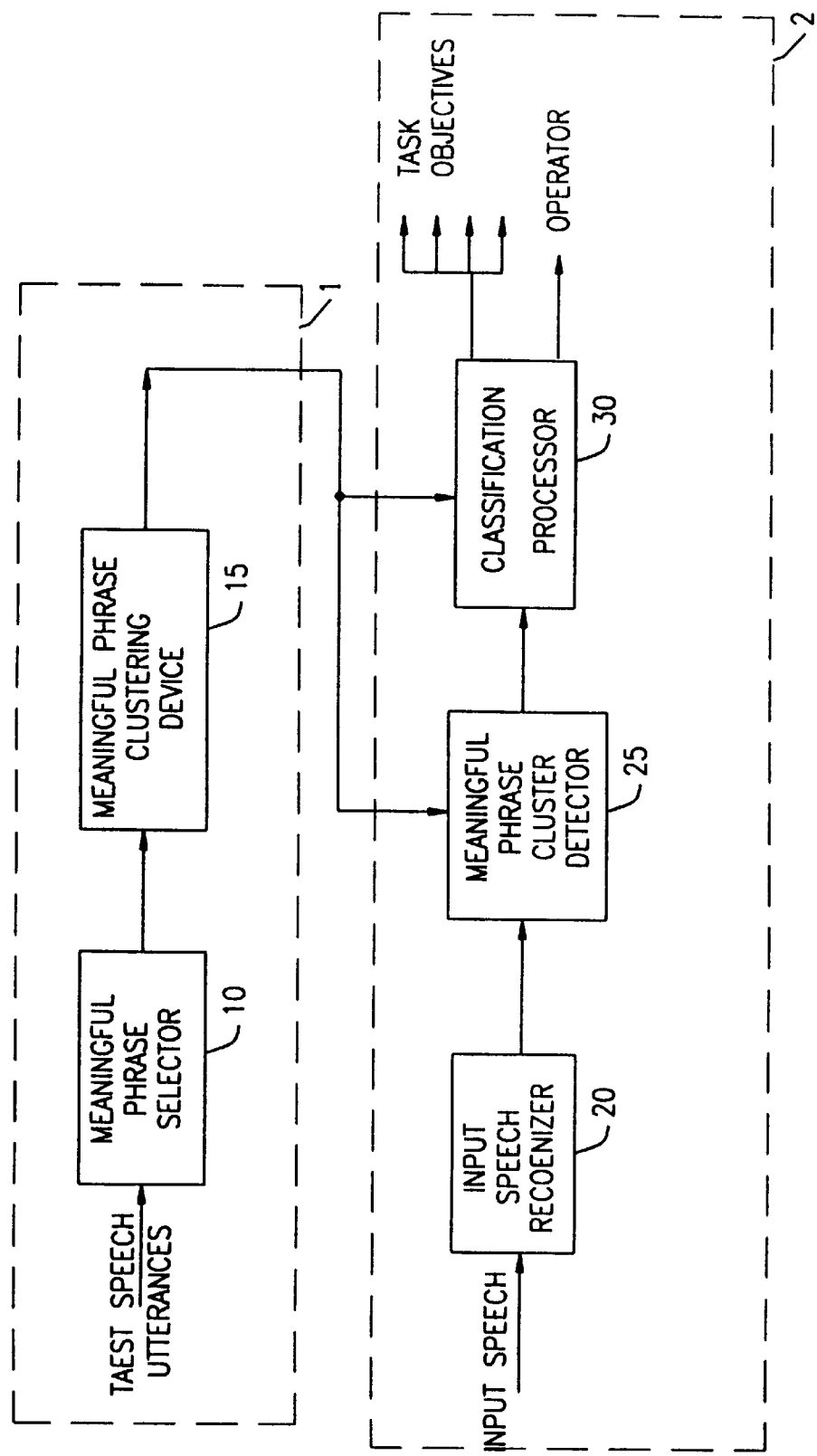
FIG. 4 presents in block diagram form an exemplary structure of the system of the invention.

The discussion following will be presented partly in terms of algorithms and symbolic representations of operations on data bits within a computer system. As will be understood, these algorithmic descriptions and representations are a means ordinarily used by those skilled in the computer processing arts to convey the substance of their work to others skilled in the art.

As used herein (and generally) an algorithm may be seen as a self-contained sequence of steps leading to a desired result. These steps generally involve manipulations of physical quantities. Usually, though not necessarily, these quantities take the form of electrical or magnetic signals capable of being stored, transferred, combined, compared and otherwise manipulated. For convenience of reference, as well as to comport with common usage, these signals will be described from time to time in terms of bits, values, elements, symbols, characters, terms, numbers, or the like. However, it should be emphasized that these and similar terms are to be associated with the appropriate physical quantities—such terms being merely convenient labels applied to those quantities.

It is important as well that the distinction between the method of operations and operating a computer, and the method of computation itself should be kept in mind. The present invention relates to methods for operating a computer in processing electrical or other (e.g., mechanical, chemical) physical signals to generate other desired physical signals.

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIG. 4 may be provided by a single shared processor. (Use of the term "processor" should not be construed to refer exclusively to hardware capable of executing software.)

Illustrative embodiments may comprise microprocessor and/or digital signal processor (DSP) hardware, such as the AT&T DSPI6 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

A fundamental objective of the invention is a task selection method involving communication between human user and machine, that shifts the burden of understanding a specialized vocabulary from the user to the machine. Thus, in a generalized embodiment, the invention is represented as a task selection method having the following characteristics:

First, a user accessing s system will be presented with a greeting similar to "How may I help you?"

After the user responds to that greeting with a natural speech statement of the user's objective (such as the implementation of a desired task), the user's request may be classified into one of a number of predefined task objectives with the task objective then being implemented.

In the preferred embodiment of the invention described hereafter, implementation of the invention's system and method will occasionally be illustrated by exemplary applications in the form user-requested tasks to be carried out by a telephone system or network. In such exemplary applications, task objectives for a user may include call billing options (e.g., collect, third-party), dialing information, billing questions, credit requests (as for a wrong or mis-dialed number), area codes, etc.

I. DETAILED DESCRIPTION OF PREFERRED EMBODIMENTS

In traditional communications environments, a user is often required to know separate numbers and/or dialing patterns to access different services available at a given communications destination, as well as possibly having to navigate a menu-driven system which then routes the user to the desired objective. With the system and method of the invention, the user is able to access a central number and the user's objective will be implemented by the communications recipient on the basis of its content.

An example of such content-based routing would be where a caller responds to a "how may I help you" prompt with I want to reverse the charges. The appropriate action is to connect the caller to an automated subsystem which processes collect calls. Another example would be a caller response of I am having a problem understanding my bill, in which case the caller should be connected to the telephone carrier's business office. The system thus needs to understand spoken language to the extent of routing the call appropriately.

A. Baseline Approach

The basic construct of such a system has been described by one of the inventors in Gorin, A. "On automated language acquisition", *J. Acoust. Soc. Am.,* 97 3441–3461, (June, 1995) [hereafter referred to as *Gorin* 95], which is incorporated herein and made a part hereof. A number of considerations from that baseline approach are material to the system and method of the invention. Certain of those considerations will be briefly reviewed hereafter. As a preface to that review, it is to be noted that the approach described in *Gorin* 95, the classification parameter for determination of an association between input text or speech and one of a set of predefined task objectives is implemented as salient words derived from a corpus of speech utterances having marked associated task objectives. In the adaptation of that method described herein, the classification parameter is implemented as meaningful phrase clusters derived from a corpus of speech utterances having marked associated routing objectives.

Central to the approach here is a database of a large number of utterances, each of which is related to one of a predetermined set of routing objectives. This database forms an input to a classification parameter algorithm. Preferably, such utterances will be extracted from actual user responses to a prompt of "How may I help you?" (or similar words to the same effect). Each utterance is then transcribed and labeled with one of the predetermined set of routing objectives. Illustrative utterances from the database utilized by the inventors are as follows:

Yeah, I want to reverse the charges

I was just disconnected from this number

I was trying to hang-up

I am trying reach Mexico

Charge this to my home phone

In a related article co-authored by one of the inventors [Gorin, A. L., Hanek, H., Rose, R. and Miller, L., "Spoken Language Acquisition for Automated Call Routing", in *Proceedings of the International Conference on Spoken Language Processing* (*ICSLP* 94), Yokohama (Sep. 18–22, 1994)] [hereafter *Gorin* 94A], it is noted that the distribution of routing objectives in such a data base may be substantially skewed. The implications of such skewing may well be taken into account in the determination of the particular set of routing objectives to be supported on an automated basis by the system of the invention.

A salience principle as related to the system of the invention has been defined in another article co-authored by one of the inventors (Gorin, A. L., Levinson, S. E. and Sankar, A. "An Experiment in Spoken Language Acquisition," *IEEE Trans. on Speech and Audio,* Vol. 2, No. 1, Part II, pp. 224–240 (January 1994)] [hereafter *Gorin* 94]. Specifically, the salience of a word is defined as the information content of that word for the task under consideration. It can be interpreted as a measure of how meaningful that word is for the task. Salience can be distinguished from and compared to the traditional Shannon information content, which measures the uncertainty that a word will occur. As is known, such traditional information content can be estimated from examples of the language, while an estimation of salience requires both language and its extra-linguistic associations.

As previously noted, *Gorin 95* uses as a classification parameter, words from test speech utterances which have a salient association with particular objective routings. U.S. patent application Ser. No. 08/528,577 and U.S. Pat. No. 5,675,707 represent a significant point of departure from that methodology through the use of meaningful phrases as the classification parameter. Before describing the method for determining such meaningful phrases, it is useful to define two types of errors experienced in such an automated routing system and a related "success" concept:

False detection of a routing objective can occur when a salient (meaningful) phrase related to one routing objective is detected in a caller's input speech when the caller's actual request was directed to another routing objective. The probability of such a false detection occurring will hereafter be referred to by the designation: $P_{FD}$ Missed detection of a routing objective occurs when the callers input speech is directed to that routing objective and none of the meaningful phrases which are associated with that routing objective are detected in the input speech. The probability of such a missed detection occurring will hereafter be referred to by the designation: $P_{MD}$ Coverage for a routing objective refers to the number of successful translations by the system of a request for a routing objective to that routing objective relative to the total number of input requests for that routing objective. As an illustrative example, a routing objective for which 60 successful translations occurred out of 100 input requests for that routing objective would be said to experience 60% coverage. It is noted that Coverage=1-$P_{MD}$ Of the two error types defined above, one is significantly more "costly" than the other. The consequence of a false detection error is the routing of a user to a different task objective than was requested by the user. Such a result is at a minimum very annoying to the user. The possibility also exists that such an error could result in a direct cost to the system provider—an annoyed customer or potential customer being classified here as an indirect cost—through some non-system error resulting from the caller being connected to an incorrect routing objective. The consequence of a missed detection error, on the other hand, is simply the routing of the user to a default operator position and the only cost is the lost opportunity cost of not handling that particular task on an automated basis. Thus, while ideally the probabilities of both missed detection and false detection should be near zero, it is far more important from the user's perspective that this objective be realized for false detection errors. As will be seen below, there are circumstances where tradeoffs must be made between minimizing one or another of these error probabilities, and this principle will be applied in such circumstances.

B. Adaptation of Baseline Approach

FIG. 1 provides several illustrative examples of False Detections and Missed Detections from the database of speech utterances used by the inventors. While the basis for error in each of these examples is believed to be largely self-explanatory, the error in the first example in each set will be briefly described. In the first example under False Detection, the meaningful phrase is I_NEED_CREDIT_EOS (end of sentence), and thus this phrase would have been classified as a request for credit. However, from reading the entire utterance, it is apparent that the caller actually wanted to be transferred to another carrier (the carrier receiving this request being AT&T). In the first example under Missed Detections, there are no meaningful phrases identified in the utterance (and therefore no basis for classifying the caller's objective), although it is apparent to humans from reading the utterance that the caller is seeking a billing credit. As a comparative illustration, FIG. 2 shows several examples of correct detection of a billing credit objective from meaningful phrases in the input speech.

There are two significant advantages of the methodology of the invention in using meaningful phrases as the classification parameter over the use of salient words in the baseline approach described in *Gorin 95*. First, with the use of words as the classification parameter, the word choices for detecting a given routing objective may be highly limited in order to achieve a minimum probability of false detection—i.e., use of only words having a near 100% likelihood of predicting the intended routing objective—and therefore the coverage for such a routing objective is likely to be very low, leading to a high probability of missed detection errors occurring. With meaningful phrases as a classification parameter, on the other hand, both low probability of false detection and low probability of missed detection are achievable.

FIG. 3 provides an illustrative example of this advantage. This figure shows the Classification Rate and the Coverage for an exemplary routing objective, Billing Credit, as the phrase used for the classification parameter grows in length and/or complexity. The Classification Rate is defined as the probability of the routing objective (CREDIT) having been requested, given the occurrence of the selected phrase in the input speech (i.e., P(CREDIT | phrase). Similarly, the Coverage term is defined as the probability of the selected phrase appearing in the input speech, given that the designated routing objective (CREDIT has been requested. In the Phrase column, parenthesis surrounding a series of terms separated by " | " indicate one of those terms appearing in the indicated position with other terms in that row. The nomenclature "F(Wrong)" indicates a grammar fragment surrounding the word "wrong", the phrase in the fourth row of that column being representative of such a grammar fragment surrounding a salient word. The designation "previous" indicates a carry forward of everything on the preceding line. And finally, the abbreviation "eos" indicates "end of sentence."

In speech recognition systems, the larger the fragment of speech presented to such a speech recognizer, the higher the probability of a correct recognition of that speech fragment. Thus a speech recognizer programmed to spot one of a set of salient words can be expected to fail in its task significantly more often than such a device programmed to spot meaningful phrases, comprising two or more words.

C. Description of the Methodology of Invention

Figure 5:
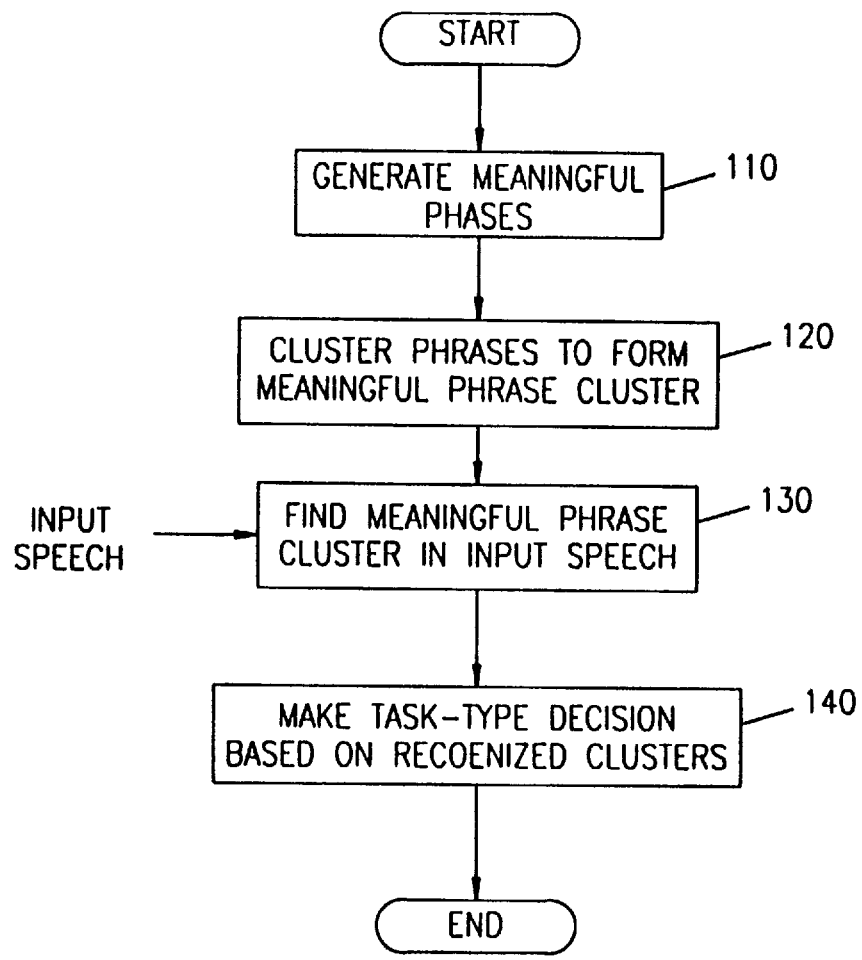
FIG. 5 depicts the method of the invention in flowchart form.

The methodology of the invention is graphically illustrated in the flowchart of FIG. 5. Following the steps of the flowchart, meaningful phrases are generated at step 110 from transcriptions of recognized utterances using estimated posterior distributions over task types and a test for significance, as set forth below. The meaningful phrases that have been generated are then clustered at step 120 and formed into meaningful phrase clusters using a distance measure between phrases, based on string and semantic distortion. Meaningful phrase clusters are then searched for and detected in input speech in step 130 using exact or approximate matching procedures. Task-type decisions are made at step 140 based on the detected meaningful phrase clusters.

D. Selection and Clustering of Meaningful Phrases

1. Selection of meaningful phrases

It is desirable in a speech recognition system to select phrases that are meaningful for the task. A measure of salience may be used to assess, for a particular phrase, the distortion between the prior and posterior distributions over the call types. However, this does not take into account the frequency with which a fragment occurs. For example, a fortunate conjunction of events can give a low-frequency phrase a high apparent salience purely by chance.

Here, this shortcoming is avoided by testing, for each phrase, the null hypothesis that is governed simply by the prior probabilities (and therefore occurs at random). Suppose a phrase $f$ has a total of n occurrences of call-type labels in training, and let $(r_1, r_2, \ldots)$ denote the set of all possible partitions of n occurrences into K=15 classes. Let the actual observed distribution of counts for $f$ be $r_f$, and the prior distribution be denoted $\{P_k\}_{k=1,\ldots,K}$. Under the null hypothesis, the probability of a partition $r_i = n_{i1}, \ldots, n_{ik}$ is given by the multinomial distribution:

$$P(r_i|n) = n! \prod_{k=1}^{K} \frac{p_k^{n_{ik}}}{n_{ik}!}$$

A phrase $f$ of frequency n is accepted at significance level $\alpha$ if $$\sum_{r_i \in A(f)} P(r_i|n) \leq \alpha \text{ where } A(f) = \{r_i: P(r_i|n) \leq P(r_f|n)\}$$

Any phrase for which the observed distribution can be seen to be a relatively likely random sample from the prior is therefore rejected. This is an exact test of significance, and is therefore valid even for phrases with very small occurrence counts. Imposing a significance level of 5% reduces the total number of phrases generated in the prior art by about 30%.

2. Meaningful phrase clustering

The second step is to cluster the phrases using an agglomerative clustering procedure. For this we use a Levenshtein string distance measure $d_s(f_1, f_2)$ between phrases $f_1, f_2$, in which the insertion, deletion and substitution penalties are weighted by word salience. However, phrases that are similar as strings can have different semantics, for example the phrases "need a credit" and "a credit card" indicate a billing credit request and credit card payment, respectively. It would be undesirable for these phrases to enter the same cluster. Again, the variability attributable to small samples must be considered in assessing this problem. Therefore, a measure of semantic distortion is used where $$d_M(f_1, f_2) = \frac{1}{K} \Sigma_k \frac{[\hat{P}(c_k \in C_t|f_1 \in F_t) - \hat{P}(c_k \in C_t|f_2 \in F_t)]^2}{\text{Var}[P(c_k \in C_t|f_1 \in F_t) - P(c_k \in C_t|f_2 \in F_t)|H]}$$

$P(C_k \in C_t|f \in F_t)$ is the estimated posterior distribution over call types $c_k$ for phrases $f$, and $C_t$, $F_t$ are the sets of labels and observed phrases for an utterance t. The denominator is an estimate of the variance of the difference between the estimated posterior values (for each call type) under hypothesis H. This hypothesis states that the two phrases have the same true (but unknown) posterior distribution. If H is true then the expected value of $d_M(f_1, f_2)$ is equal to 1.0 regardless of the phrase occurrence counts, so a large value for this measure is evidence for divergence between the posterior distributions. The overall measure used for clustering is a combination of the string and semantic distortions.

Figure 6:
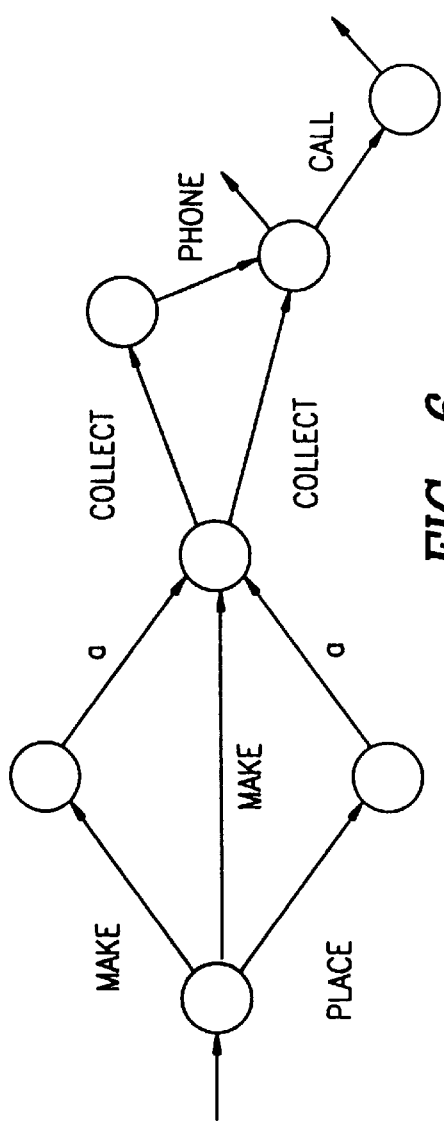
FIG. 6 illustrates a Meaningful Phrase Cluster.

Each of the resulting phrase clusters is converted into a Finite State Machine (FSM) representing a meaningful phrase cluster. An example is shown in FIG. 6. In this example, "make a collect call", is clustered with the other meaningful phrases, "place a collect call", "make collect call" and "make a collect phone call".

Figure 7:
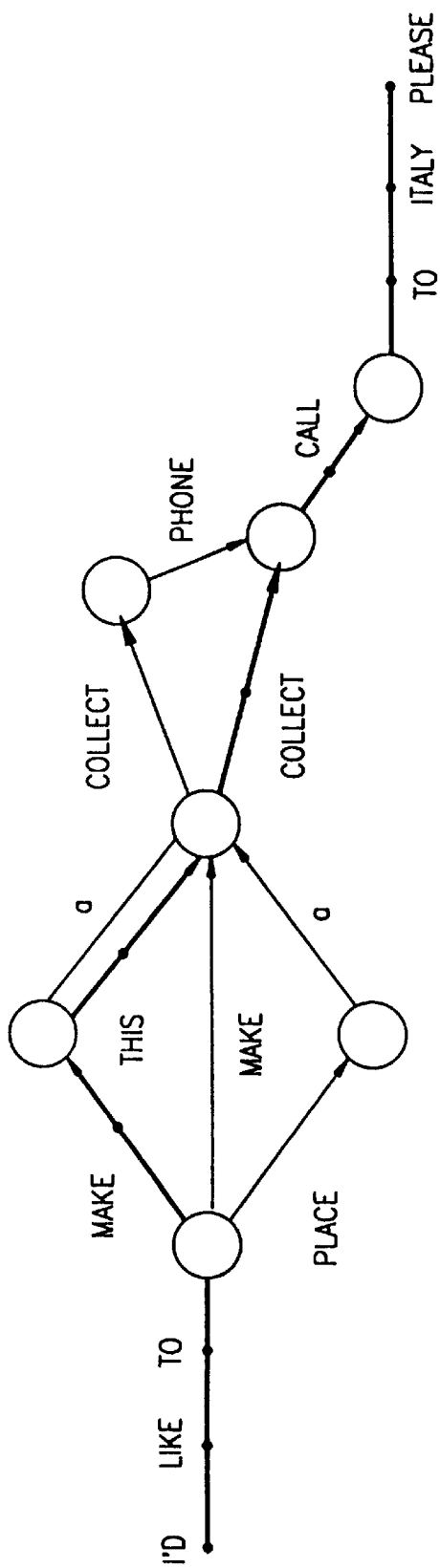
FIG. 7 illustrates a Meaningful Phrase Cluster using approximate matching.

The posterior distribution over the call types is then obtained for each FSM. Observations in the form of exact or approximate matches to a path through the FSM are then found for the test utterances. The approximate matches are found using a dynamic programming algorithm in which word salience is used to weight the errors. An example of an approximate match is shown in FIG. 7, where the word a is substituted by this, both words having low salience.

3. Exploiting multiple phrases

In order to combine the evidence from several observations, there are several methods well known in the art. For example, the call types can be ranked by adopting a "bag-of-phrases" model:

$$P(c_k \in C_t|f_1, \ldots, f_m \in F_t) \approx P(c_k \in C_t) \prod_{i=1}^{m} \frac{P(c_k \in C_t|f_i \in F_t)}{P(c_k \in C_t)}$$

Meaningful phrase clusters are often found to be correlated, and experiments involving higher-order statistical models are in progress.

4. Classification Experiments

The initial results were obtained using a set of meaningful phrases of length up to four words. A test set of 1000 utterances was processed by a large-vocabulary speech recognizer. Matches of phrases to the output were found, and parsed in a manner which favors longer phrases because these tend to be more salient. The call-type was determined by a peak-of-fragments classifier. One of the call-type labels is other, and the desired goal is for these particular calls to be rejected. By varying the acceptance threshold and plotting correct classification rate against false rejection rate we obtain the ROC curves shown by the dotted lines in FIG. 8.

Figure 8:
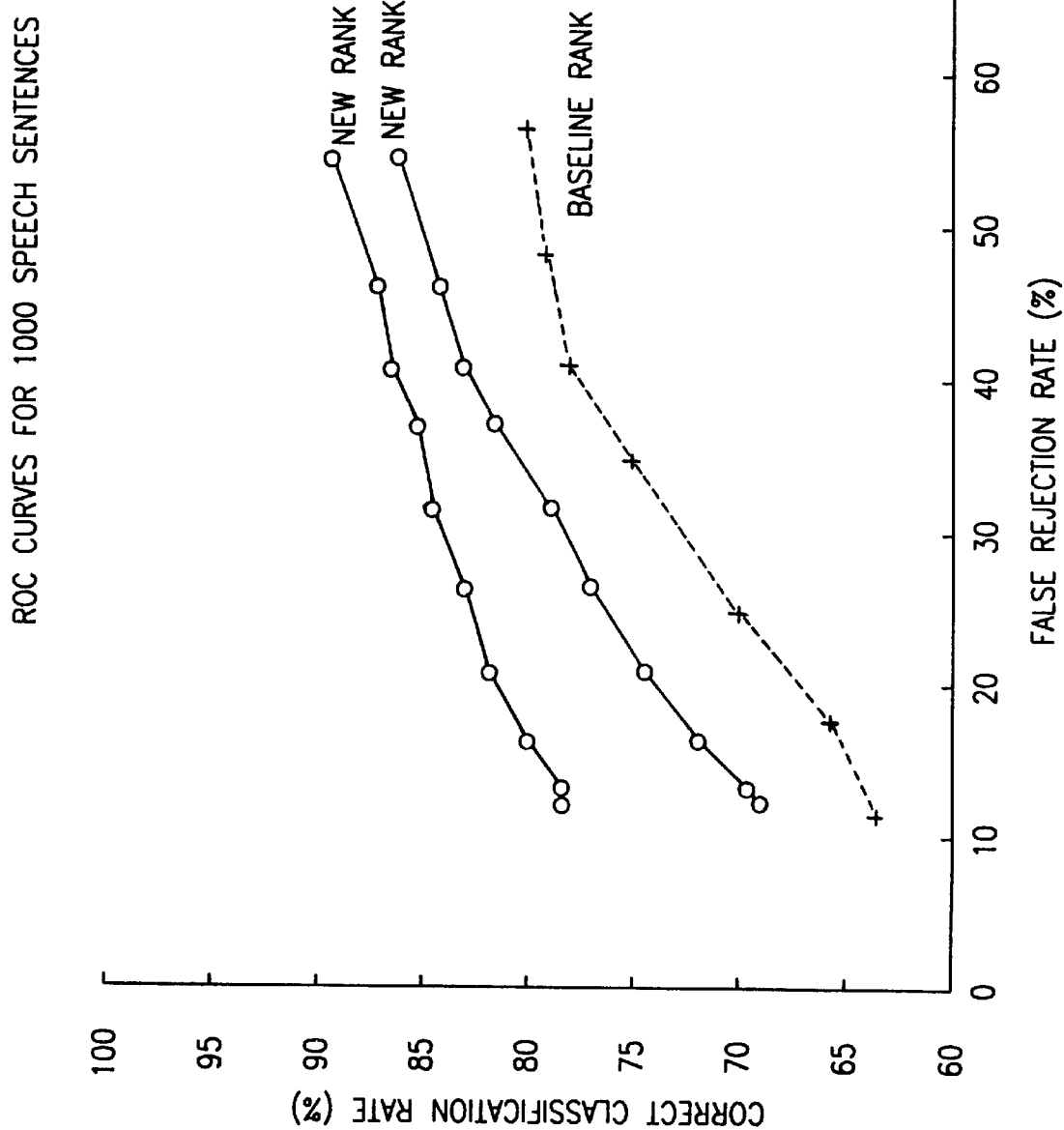
FIG. 8 is a graph of ROC curves illustrating the performance of the invention.

The solid lines in FIG. 8 show the results obtained using the procedures described above. A significant improvement in performance is seen, for the same output of the speech recognition system. This is especially notable in the area of a useful operating point with 87% correct classification rate at rank 2, for 40% false rejection rate.

E. Exemplary Structure for the Invention

FIG. 4 shows in block diagram form the essential structure of the invention. As can be seen from FIG. 4, that structure comprises two related subsystems: Meaningful Phrase Generation Subsystem 1 and Input Speech Classification Subsystem 2. As already described, Meaningful Phrase Generation Subsystem 1 operates on a database of a large number of utterances each of which is related to one of a predetermined set of routing objectives, where each such utterance is labeled with its associated routing objective. The operation of this subsystem is essentially carried out by Meaningful Phrase Selector 10 which selects as an output a set of meaningful phrases having a probabilistic relationship with one or more of the set of predetermined routing objectives with which the input speech utterances are associated. The selected meaningful phrases are then input to a Meaningful Phrase Clustering Device 15 that clusters those meaningful phrases which are semantically related. The operation of Meaningful phrase Selector 10 and the Meaningful Phrase Clustering Device 15 are generally determined in accordance with the previously described algorithm for selecting and clustering meaningful phrases.

Operation of Input Speech Classification Subsystem 2 begins with the inputting of a user's task objective request, in the caller's natural speech, to Input Speech Recognizer 20. The Input Speech Recognizer 20 may be of any known design and performs the function of recognizing, or spotting, the existence of one or more meaningful phrase in the input speech. A Meaningful Phrase Cluster Detector 25 then detects the meaningful phrase clusters present among the meaningful phrases recognized. As can be seen in the figure, the meaningful phrases clusters developed by Meaningful Phrase Generation Subsystem 1 are provided as an input to Meaningful Phrase Cluster Detector 25.

The output of Meaningful Phrase Detector 25, which will comprise the detected meaningful phrases clusters appearing in the caller's routing objective request, is provided to Classification Processor 30. The Classification Processor 30 may apply a confidence function, based on the probabilistic relation between the recognized meaningful phrases clusters and selected task objectives, and makes a decision either to implement a particular task objective or a determination that no decision is likely, in which case the user may be defaulted to an operator position.

As will thus be apparent, the meaningful phrase clusters developed by Meaningful Phrase Generation Subsystem 1 are used by the Meaningful Phrase Cluster Detector 25, to define the meaningful phrase clusters which the Detector is programmed to spot, and to Classification Processor 30, defining the task objectives related to meaningful phrases input from the Meaningful Phrase Cluster Detector 25 and, if warranted, for establishing the level of confidence for a relation of such input meaningful phrase clusters to a particular task objective.

CONCLUSION

A method for automated task selection has been disclosed which carries out the function of searching for a classification parameter in natural speech. These classification parameters are presented in the form of compact meaningful phrase clusters which are generated from a set of selected meaningful phrases. By automatically selecting and clustering meaningful phrases, the overall accuracy of automated routing systems is increased.

Although the present embodiment of the invention has been described in detail, it should be understood that various changes, alterations and substitutions can be made therein without departing from the spirit and scope of the invention as defined by the appended claims.

What is claimed is:

1. A method for automated task classification which operates on a task objective of a user, the task objective being expressed in natural speech of the user, comprising:
   selecting meaningful phrases from a plurality of transcribed speech utterances;
   clustering selected ones of the meaningful phrases which occur in similar semantic contexts into meaningful phrase clusters;
   detecting meaningful phrase clusters present in input speech utterances; and
   making task-type classification decisions based on the detected meaningful phrase clusters in the input speech utterances.

2. The automated task classification method of claim 1, wherein the meaningful phrases are selected using a test for significance.

3. The automated task classification method of claim 1, wherein the meaningful phrases are clustered using a distortion measure between the meaningful phrases.

4. The automated task classification method of claim 3, wherein the distortion measure is based on string distortion.

5. The automated task classification method of claim 3, wherein the distortion measure is based on semantic distortion.

6. The automated task classification method of claim 3, wherein the distortion measure is a combination of string and semantic distortion.

7. The automated task classification method of claim 1, wherein the meaningful phrase clusters are detected in input speech by exactly matching the input speech to any of the meaningful phrase clusters.

8. The automated task classification method of claim 1, wherein clusters are detected in input speech by exactly or approximately matching the input speech to any of the meaningful phrase clusters.

9. The automated task classification method of claim 1, wherein the task-type classification decisions are ranked using a statistical model.

10. The automated task classification method of claim 1, further comprising a neural network for making the task-type classification decisions.

11. A method for automated call-type classification which operates on the call routing objective of a user, the call-routing objective being expressed in natural speech of the user, comprising:
    selecting meaningful phrases from a plurality of transcribed speech utterances,
    clustering selected ones of the meaningful phrases which occur in similar semantic contexts into meaningful phrase clusters;
    detecting meaningful phrase clusters present in input speech utterances; and
    making call-type classification decisions based on the detected meaningful phrase clusters in the input speech utterances.

12. The automated call-type classification method of claim 11, wherein the meaningful phrases are selected using a test for significance.

13. The automated call-type classification method of claim 11, wherein the meaningful phrases are clustered using a distortion measure between meaningful phrases.

14. The automated call-type classification method of claim 13, wherein the distortion measure is based on string distortion.

15. The automated call-type classification method of claim 13, wherein the distortion measure is based on semantic distortion.

16. The automated call-type classification method of claim 13, wherein the distortion measure is a combination of string and semantic distortion.

17. The automated call-type classification method of claim 11, wherein the meaningful phrase clusters are detected in input speech by exactly matching the input speech to any of the meaningful phrase clusters.

18. The automated call-type classification method of claim 11, wherein the meaningful phrase clusters are detected in input speech by exactly or approximately matching the input speech to any of the meaningful phrase clusters.

19. The automated call-type classification method of claim 11, wherein call-type classification decisions are ranked using a statistical model.

20. The automated call-type classification method of claim 11, wherein the call-type classification decisions are made using a neural network.

21. An automated task classification system which operates on task objectives of a user, the task objectives being expressed in natural speech of the user, comprising:

a meaningful phrase selector that selects a plurality of meaningful phrases from a set of speech utterances, each of the meaningful phrases being selected based on one of a predetermined set of the task objectives;

a meaningful phrase clustering device for clustering selected meaningful phrases which occur in similar semantic contexts into meaningful phrase clusters;

an input recognizing device for detecting any of the clustered meaningful phrases in input speech of the user, the input recognizing device having as an input the meaningful phrases clustered by the meaningful phrase clustering device; and a classification device responsive to an input of the detected meaningful phrase clusters for making a classification decision based on the detected meaningful phrase clusters as to one of the set of predetermined task objectives.

22. The automated task classification system of claim 21 wherein the meaningful phrase selector selects meaningful phrases using a test for significance.

23. The automated task classification system of claim 21 wherein the meaningful phrase clustering device clusters meaningful phrases using a distortion measure between meaningful phrases.

24. The automated task classification system of claim 23, wherein the distortion measure is based on string distortion.

25. The automated task classification system of claim 23, wherein the distortion measure is based on semantic distortion.

26. The automated task classification system of claim 23, wherein the distortion measure is a combination of string and semantic distortion.

27. The automated task classification system of claim 21, wherein the input recognizing device detects meaningful phrase clusters in input speech by exactly matching the input speech to any of the meaningful phrase clusters.

28. The automated task classification system of claim 21, wherein the input recognizing device detects meaningful phrase clusters in input speech by exactly or approximately matching the input speech to any of the meaningful phrase clusters.

29. The automated task classification system of claim 21, wherein the classification device ranks decisions using a statistical model.

30. The automated task classification system of claim 21, wherein the classification device makes decisions using a neural network.

* * * * *